Patented Apr. 22, 1941

2,239,290

UNITED STATES PATENT OFFICE 2,239,290

AZOMETHINE DYESTUFFS CONTAINING A HEAVY METAL

Hans Krzikalla and Helmut Pfitzner, Ludwigshafen - on - the - Rhine, and Karl Schmidt, Cologne - Muhlheim, Germany, assignors to General Aniline & Film Corporation, a corporation of Delaware No Drawing. Application April 7, 1938, Serial No. 200,674. In Germany April 16, 1937

6 Claims. (Cl. 260—438)

The present invention relates to azomethine dyestuffs containing a heavy metal.

We have found that new dyestuffs are obtained by causing primary aromatic amines containing at least one ortho-position to an amino group a radical capable of forming complexes with heavy metals having an atomic weight from 52 to 66 to react on ketones or aldehydes which also contain a radical of the said kind in orthoposition, the resulting substances being treated with agents supplying the said metals, if desired in the same working operation.

Radicals forming complexes with metals of the said kind are, for example, —OH—, —O—alkyl, —SH, —S—alkyl, —NH₂, —NH—, —COOH or —O—CH₂—COOH. Among suitable amines there may be mentioned for example orthoaminophenols, 1-amino-2,4-dihydroxybenzene, 1-amino - 2,4 - dihydroxy - 5-aminobenzene, orthoaminohydroxycarbazole, 3,3' - dihydroxy - benzidine, ortho-aminonaphthols, ortho-anisidines, ortho - aminothiophenols, ortho-aminohydroxyanthraquinones, ortho-arylenediamines, anthranilic acid, 4,4'-diamino-3,3'-dicarboxy-diphenyl, ortho-aminophenoxyacetic acid and their sulphonic or carboxylic acids. Among suitable ketones and aldehydes there may be mentioned for example salicyl aldehyde, mono- or dichlorsalicylaldehyde, 2-hydroxy-1-naphthaldehyde, 1-hydroxy-2-naphthaldehyde, ortho-methoxybenzaldehyde, orthoaminobenzaldehyde, 1-aminoanthraquinone - 2 - aldehyde, ortho-hydroxyacetophenone, ortho-aminoacetophenone, carbazoleortho-hydroxyaldehyde, anthracene-ortho-hydroxyaldehyde and their derivatives which may already be dyestuffs.

The starting materials should be so chosen that at least one contains at least one acid group, particularly a sulphonic group. In cases in which neither of the starting materials contains an acid group at most one of them shall contain as metal-sensitive group a hydroxyl group.

The substances containing sulphonic acid groups may be converted into the metal compounds by treatment with agents supplying metals, as for example with chromium, copper or iron salts, working being carried on either at atmospheric or also increased pressure. The water-insoluble substances are converted into their metal compounds in organic solvents, as for example in the presence of an alcohol or a base of the nature of pyridine.

The dyestuffs thus obtainable may be used for dyeing wool, silk, leather, cotton, artificial silk or for the preparation of lacquers or artificial compositions. In chemical structure they are azomethines containing metal. Contrasted with the azomethines, which are generally speaking very sensitive to acid, they are so stable to acid that they are also suitable for dyeing in acid baths.

The following examples will further illustrate how our said invention may be carried out in practice but the invention is not restricted to these examples. The parts are by weight.

Example 1

A chromium formate solution prepared from 37.2 parts of a 24.5 per cent chromium oxide paste, 19 parts of 85 per cent formic acid and 100 parts of water is added to a boiling mixture of 23.4 parts of 4-nitro-2-aminophenol-6-sulphonic acid, 28 parts of crystallized sodium acetate and 12.2 parts of salicyl aldehyde and 200 parts of water. After boiling under reflux for about three hours, the solution is evaporated. The resulting compound may be salted out, filtered off by suction and dried.

The dyestuff corresponds to the probable formula

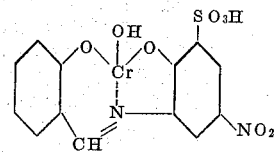

The dyestuff is also formed when the reaction mixture is heated at 120° for 2 hours. It dyes wool, silk or leather level yellow shades of good fastness. If the preparation of the chromium compound is carried out without the addition of sodium acetate the dyestuff is obtained in crystallized form. It dissolves very readily in nitrocellulose lacquers.

Instead of 4-nitro-2-aminophenol-6-sulphonic acid there may also be used 6-nitro-2-aminophenol-4-sulphonic acid, 4-chlor-2-aminophenol-6-sulphonic acid, 2-aminophenol-4-sulphonic acid, 4-methyl-2-aminophenol-6-sulphonic acid, 4-acetamino-2-aminophenol-6-sulphonic acid or 2-aminophenol-4,6-disulphonic acid, compounds giving yellow dyeings also being obtained. With 2,3-aminonaphthol-6-sulphonic acid a yellow-orange dyestuff is obtained and with 1,2-aminonaphthol-4-sulphonic acid a yellow-brownish dyestuff is obtained. Other chromium salts may be used instead of chromium formate.

Example 2

A chromium formate solution prepared from 37.2 parts of a 24.5 per cent chromium oxide paste and 19 parts of 85 per cent formic acid is added to a boiling mixture of 21.7 parts of 4-sulpho-anthranilic acid, 28 parts of crystallized sodium acetate, 12.2 parts of salicyl aldehyde and 200 parts of water. After boiling for several hours or heating under pressure, the whole is filtered and the filtrate evaporated to dryness. The dyestuff dyes leather greenish yellow shades.

The dyestuff corresponds to the probable formula

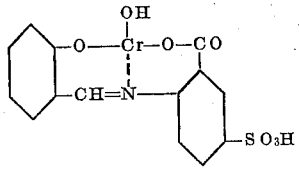

2-hydroxynaphthaldehyde, ortho-aminobenzaldehyde or ortho-hydroxyacetophenone may be used instead of salicyl aldehyde, similar dyestuffs being obtained.

Example 3

A mixture of 22.5 parts of 2-aminoanisol-4-sulphonic acid sodium salt, 12.2 parts of salicyl aldehyde, 37.2 parts of a 24.5 per cent chromium oxide paste, 19 parts of 85 per cent formic acid and 300 parts of water is heated for 3 hours at 130° C. whereby the methyl group is split off and a chromium compound is formed. The mixture is then evaporated to dryness. The dyestuff thus obtained corresponds to that obtained from 2-aminophenol-4-sulphonic acid, salicyl aldehyde and chromium formate (see Example 1, last paragraph).

The dyestuff corresponds to the probable formula

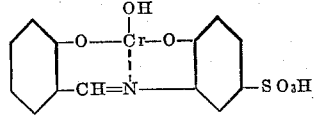

5-nitro-2-anisidine-4-sulphonic acid or 1-amino-2-methoxynaphthalene-6-sulphonic acid may be used instead of 2-aminoanisol-4-sulphonic acid, and para-cresotinic acid aldehyde or ortho-methoxybenzaldehyde may be used instead of salicyl aldehyde. In all cases compounds similar to the said dyestuff are obtained.

Example 4

24.4 parts of salicyl aldehyde are added to a boiling solution of 20.4 parts of 2,6-diaminophenol-4-sulphonic acid and 28 parts of crystallized sodium acetate in 200 parts of water. After boiling for a short time or even simultaneously there is added a chromium formate solution corresponding to 9 parts of chromium oxide. After boiling for about four hours, the dyestuff is salted out with common salt, filtered off by suction and dried. It dyes wool, silk and leather fast orange shades. If an iron salt be used instead of chromium formate, a brown dyestuff is obtained.

The dyestuff corresponds to the probable formula

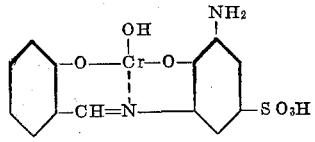

Example 5

20.2 parts of 2-hydroxybenzaldehyde-5-sulphonic acid, 28 parts of crystallized sodium acetate and 19.9 parts of 2-aminophenol in 200 parts of water are heated to boiling and a chromium formate solution is added which has been prepared from 37.2 parts of a 24.5 per cent chromium oxide paste, 18 parts of 85 per cent formic acid and 100 parts of water. After boiling for several hours, the solution is evaporated. The dyestuff thus obtained dyes wool fast yellow shades.

The dyestuff corresponds to the probable formula

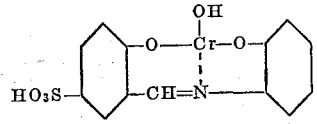

Instead of 2-aminophenol there may also be used 4-chlor-2-aminophenol, 4-nitro-2-aminophenol, 4,6-dinitro-2-aminophenol, 6-nitro-4-chlor-2-aminophenol, 2,6-diamino-4-methylphenol and similar 2-aminophenols. From yellow to orange-brown shades of color are thus obtained.

A brown dyestuff is obtained with 2-hydroxy-3-aminoanthraquinone.

Example 6

20.2 parts of 2-hydroxybenzaldehyde-5-sulphonic acid, 28 parts of crystallized sodium acetate and 10.8 parts of 3,3'-dihydroxy-4,4'-diaminodiphenyl are heated with 300 parts of water. There is then added a chromium formate solution corresponding to 9 parts of chromium oxide. After boiling for from 6 to 10 hours, the whole is filtered and the filtrate evaporated. The dyestuff obtained dyes wool brownish orange shades and also dyes viscose artificial silk.

The dyestuff corresponds to the probable formula

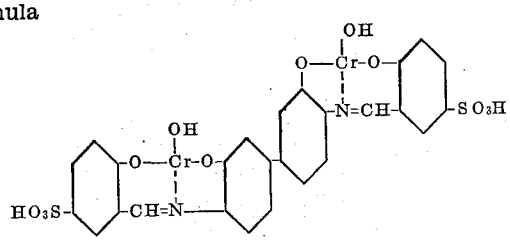

By starting from 3,3'-dimethoxy-4,4'-diaminodiphenyl and heating the reaction mixture more strongly, the methyl groups are split off and the same dyestuff is obtained. With 4,4'-diamino-3,3'-dicarboxydiphenyl a yellower shade of color is obtained.

Example 7

23.4 parts of 4-nitro-2-aminophenol-6-sulphonic acid, 28 parts of crystallized sodium acetate and 17.2 parts of 2-hydroxy-1-naphthaldehyde are boiled with 300 parts of water and a chromium formate solution corresponding to 9 parts of chromium oxide added thereto. After boiling for several hours, the dyestuff containing chromium crystallizes out. After cooling the solution, it is filtered off by suction and dried. It dyes wool brownish orange shades.

The dyestuff corresponds to the probable formula

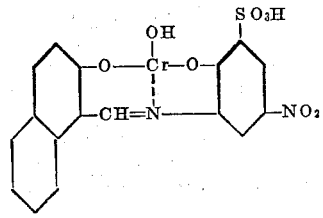

The hydroxynaphthaldehyde yields a red dyestuff with 1.2-aminonaphthol-4-sulphonic acid.

Similar dyestuffs are obtained with various 2-hydroxy-1-naphthaldehyde-mono- and -di-sulphonic acids, as well as with 1-hydroxy-2-naphthaldehyde and its sulphonic acids.

*Example 8*

37.4 parts of the dyestuff obtainable by diazotizing 21.8 parts of 4-nitraniline-2-sulphonic acid and coupling with 12.2 parts of salicyl aldehyde are dissolved in 500 parts of water and there are then added at the boiling point 23.4 parts of 4-nitro-2-aminophenol-6-sulphonic acid, 28 parts of crystallized sodium acetate and a chromium formate solution coresponding to 9 parts of chromium oxide. After boiling for 4 hours, the liquid is evaporated. The dyestuff dyes wool, silk and leather fast brown-orange shades.

The dyestuff corresponds to the probable formula

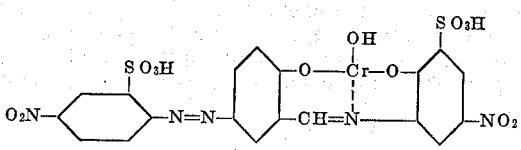

The salicyl aldehyde or also, for example, 1-hydroxy-2-naphthaldehyde, may be coupled with a great variety of diazo compounds. In this way there may therefore be obtained a very large number of colored hydroxyaldehydes which in turn may be reacted with a great variety of ortho-aminophenols and metals.

The dyestuffs thus obtainable have varying affinity for fibres which in some cases is very good, as for example affinity for cotton, wool or artificial silk. By reason of the great variety of initial materials which may be used, the shades of color belong to all regions.

*Example 9*

A mixture of 13.6 parts of 4,4'-diaminodiphenyl-3,3'-dicarboxylic acid, 20.2 parts of 2-hydroxybenzaldehyde-5-sulphonic acid and 28 parts of crystallized sodium acetate with 300 parts of water is heated to boiling. Then, a solution of chromium formate which corresponds to 9 parts of chromium oxide is added. After boiling for from 3 to 4 hours the mixture is filtered and the filtrate evaporated. The resulting dyestuff dyes wool yellow shades. The corresponding copper compound is somewhat more greenish and goes on to the fabric directly.

The dyestuff corresponds to the probable formula

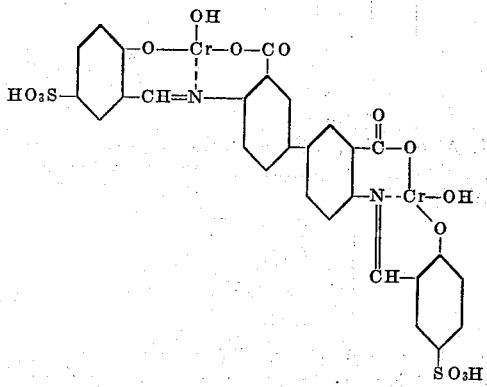

Instead of 4,4'-diaminodiphenyl-3,3'-dicarboxylic acid also 4,4'-diaminodiphenylurea-3,3'-dicarboxylic acid or 4,4'-diaminodiphenylmethane 3,3'-dicarboxylic acid, and instead of 2-hydroxybenzaldehyde-5-sulphonic acid 1-hydroxy-2-naphthaldehyde-5-sulphonic acid or other hydroxynaphthaldehyde-sulphonic acids may be empolyed.

*Example 10*

A mixture of 11 parts of 1,2-diaminobenzene, 25.2 parts of 1-hydroxy-2-naphthaldehyde-5-sulphonic acid, 28 parts of crystallized sodium acetate and a solution of chromium formate corresponding to 9 parts of chromium oxide, is boiled in 200 parts of water for some hours. After filtering off, the dyestuff is salted out from the filtrate and dried. It dyes wool and leather orange shades.

The dyestuff corresponds to the probable formula

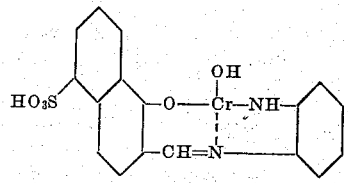

Other 1,2-diamines suitable for the preparation of such dyestuffs are 1,2-diaminobenzene-4-sulphonic acid, 4-nitro-1,2-diaminobenzene, 1,2-diaminonaphthalene, 1,2-diaminonaphthalene-5-sulphonic acid or 1,2-diaminoanthraquinone.

*Example 11*

12.5 parts of 2-aminothiophenol and 22.5 parts of the sodium salt of 2-hydroxybenzaldehyde-5-sulphonic acid are boiled in 200 parts of water. Then the mixture is heated to boiling with a solution of 37.2 parts of a 24.5 per cent chromium oxide paste in 100 parts of water and 19 parts of 85 per cent formic acid for some hours. The dyestuff obtained by evaporating dyes leather and wool yellow-brown shades.

The dyestuff corresponds to the probable formula

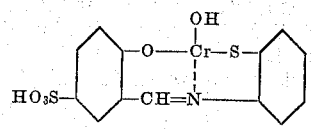

A dyestuff which yields browner dyeings is obtained from 1-hydroxy-2-naphthaldehyde-5-sulphonic acid.

*Example 12*

A mixture of 25 parts of the dyestuff from diazotized aniline and anthranilic acid (which may also be obtained from the formaldehyde bisulphite compound of anthranilic acid), 20.2 parts of 2-hydroxybenzaldehyde-5-sulphonic acid, 28 parts of crystallized sodium acetate and a solution of chromium formate which corresponds to 9 parts of chromium oxide, is heated to boiling for some hours. Then the dyestuff is salted out and dried. It dyes wool and leather orange-brown shades.

The dyestuff corresponds to the probable formula

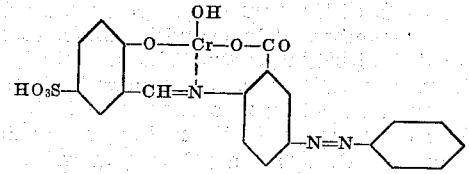

Similar dyestuffs are obtained by employing any other amines.

Example 13

A mixture of 8.1 parts of ortho-hydroxybenzaldehyde, 8.2 parts of ortho-anisidine, 12.2 parts of zinc acetate and 200 parts of 50 per cent aqueous ethanol is heated at 130° C. for 8 hours. The yellow dyestuff thus obtained is isolated, washed and dried. It may serve for example for coloring lacquers.

The dyestuff corresponds to the probable formula

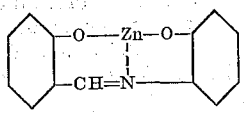

Example 14

A mixture of 9.4 parts of the zinc salt of ortho-amino-thiophenol, 10.2 parts of 2-hydroxy-1-naphthaldehyde, 10.8 parts of zinc acetate and 240 parts of methanol is heated at 65° C. for 15 hours. The precipitate having a powerful yellow coloration is then filtered off by suction, washed with methanol and dried at about 70° C. The yield amounts to 15.6 parts.

The dyestuff corresponds to the probable formula

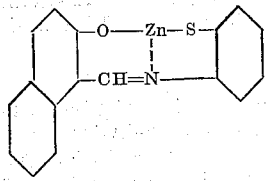

Example 15

A solution of 8.6 parts of 2-hydroxy-1-naphthaldehyde, 11.2 parts of 2-aminodiphenylamine hydrochloride and 18.3 parts of zinc acetate in 250 parts of methanol is heated at 65° C. for an hour. The separating yellow zinc compound is filtered off by suction, washed with methanol and dried at 50° C. 21.4 parts of a yellow dyestuff are thus obtained.

The dyestuff corresponds to the probable formula

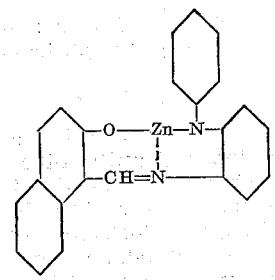

If instead of zinc acetate the corresponding amount of chromium acetate is used, 19 parts of a brown dyestuff are obtained.

Example 16

13.4 parts of the benzylidene compound of 2-hydroxy-1-naphthaldehyde and 1-aminocarbazole are heated with 14.6 parts of zinc-acetate in 200 parts of methanol at 65° C. for about 10 hours. The separated yellow zinc compound is filtered off by suction, washed with methanol and dried at about 80° C. Thus a yellow pigment is obtained which yields clear yellow shades if used for producing graphical prints.

The dyestuff corresponds to the probable formula

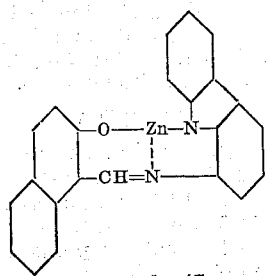

Example 17

A mixture of 14 parts of 2,4-dihydroxybenzaldehyde, 23.4 parts of the sodium salt of 4-nitroaminophenol-6-sulphonic acid, 250 parts of water and a solution of chromium formate (which is prepared according to the manner described in Example 1) is heated at 110° C. for an hour. After salting out a dyestuff is obtained which dyes wool uniform claret shades having good fastness properties as regards washing and fulling.

The dyestuff corresponds to the probable formula

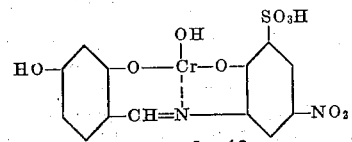

Example 18

23.4 parts of 4-nitroaminophenol-6-sulphonic acid are diazotized and coupled with 14.5 parts of 2,4-dihydroxybenzaldehyde in a solution rendered alkaline by means of sodium bicarbonate. Then the resulting dihydroxyazo dyestuff is salted out, filtered off by suction and reacted with an equimolecular proportion of 4-nitro-2-aminophenol-6-sulphonic acid by heating in aqueous solution. A solution of chromium formate prepared from 76 parts of a 24.5 per cent chromium oxide paste, 38 parts of 85 per cent formic acid and 200 parts of water is added and the mixture is boiled under reflux for several hours. A dyestuff is obtained which dyes leather and wool fast red-brown shades.

The dyestuff corresponds to the probable formula

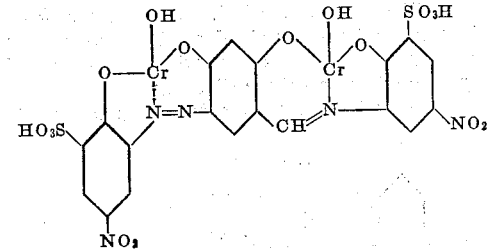

What we claim is:

1. A complex heavy metal compound of an azomethine compound of the following general formula

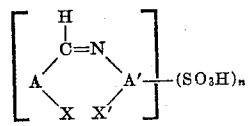

wherein A and A' stand for arylene radicals, X and X' for radicals capable of forming complexes with heavy metals, selected from the class consisting of —OH, O—alkyl, —SH, —S—alkyl, —NH₂, —NH—, —COOH and —O—CH₂.COOH—, X and X' standing in ortho-positions to the azomethine bridge, and $n$ for a whole number up to 3, the heavy metal being selected from the heavy metals having an atomic weight of from 52 to 66.

2. A complex chromium compound of an azomethine compound of the following general formula

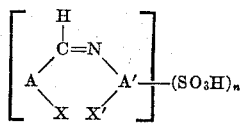

wherein A and A' stand for arylene radicals, X and X' for radicals capable of forming complexes with chromium selected from the class consisting of —OH, O—alkyl, —SH, —S—alkyl, —NH$_2$, —NH—, —COOH and —O—CH$_2$.COOH, X and X' standing in ortho-positions to the azomethine bridge, and $n$ for a whole number up to 3.

3. A complex chromium compound of an azomethine compound of the following general formula

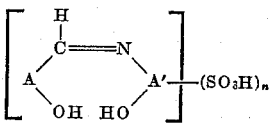

wherein A and A' stand for arylene radicals, the hydroxyl groups standing in ortho-positions to the azomethine bridge, and $n$ for a whole number up to 3.

4. The complex chromium compound of the azomethine compound of the formula

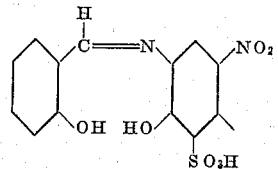

5. The complex chrominum compound of the azomethine compound of the formula

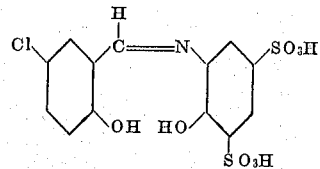

6. The complex chromium compound of the azomethine compound of the formula

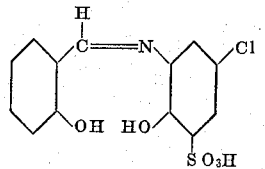

HANS KRZIKALLA.
HELMUT PFITZNER.
KARL SCHMIDT.